US012444377B2

United States Patent

Tsai et al.

(10) Patent No.: US 12,444,377 B2
(45) Date of Patent: Oct. 14, 2025

(54) PROCESSING SYSTEM FOR SIMULTANEOUSLY PRESENTING BRIGHTNESS PERFORMANCE OF DIFFERENT AREAS ON A SINGLE DISPLAY SCREEN

(71) Applicant: STARLIGHT DISPLAY CORPORATION, Hsinchu (TW)

(72) Inventors: Yi-Yu Tsai, Hsinchu (TW); Shao-Wei Chiu, Hsinchu (TW); Yin-Cheng Huang, Hsinchu (TW)

(73) Assignee: STARLIGHT DISPLAY CORPORATION, Hsinchu (TW)

(*) Notice: Subject to any disclaimer, the term of this patent is extended or adjusted under 35 U.S.C. 154(b) by 0 days.

(21) Appl. No.: 18/740,536

(22) Filed: Jun. 12, 2024

(65) Prior Publication Data

US 2024/0428745 A1 Dec. 26, 2024

(30) Foreign Application Priority Data

Jun. 26, 2023 (TW) ................................ 112123729

(51) Int. Cl.
*G09G 3/34* (2006.01)
*G09G 5/10* (2006.01)

(52) U.S. Cl.
CPC ............ *G09G 3/3426* (2013.01); *G09G 5/10* (2013.01); *G09G 2320/066* (2013.01); *G09G 2320/0673* (2013.01); *G09G 2360/144* (2013.01)

(58) Field of Classification Search
CPC .. G09G 3/3426; G09G 5/10; G09G 2320/066; G09G 2320/0673; G09G 2360/144; G09G 3/20; G09G 2320/0626
See application file for complete search history.

(56) References Cited

U.S. PATENT DOCUMENTS

| | | | | |
|---|---|---|---|---|
| 9,409,464 B2 * | 8/2016 | Tomkins | ................... | B60J 3/04 |
| 2008/0054159 A1 * | 3/2008 | Yu | ......................... | G01J 1/4204 250/205 |
| 2009/0168185 A1 * | 7/2009 | Augustine | .................. | B60J 3/04 359/613 |

(Continued)

FOREIGN PATENT DOCUMENTS

| | | |
|---|---|---|
| CN | 103035203 | 4/2013 |
| CN | 111754929 | 10/2020 |

(Continued)

*Primary Examiner* — Antonio Xavier
(74) *Attorney, Agent, or Firm* — Fei-hung Yang

(57) ABSTRACT

A processing system for simultaneously presenting brightness performance of different areas on a single display screen includes: a detection processor and a control processor. The detection processor performs a multi-point photometry of a pre-imaging area to find out the difference in ambient light intensity distribution among the points on the display screen after a display device is installed, where the pre-imaging area refers to an area of a display device set up or projected for viewing. The control processor connected to the detection processor for correspondingly cutting a screen range of the display device into multiple modulation areas based on the ambient light intensity difference of the pre-imaging area. In this way, the display screen can be adjusted to adapt to various environments with differences in brightness or position.

6 Claims, 8 Drawing Sheets

(56) References Cited

U.S. PATENT DOCUMENTS

| | | | | |
|---|---|---|---|---|
| 2015/0062185 | A1* | 3/2015 | Yang | G09G 3/20 345/690 |
| 2016/0314762 | A1* | 10/2016 | Lee | G09G 3/001 |
| 2017/0316757 | A1* | 11/2017 | Whang | G09G 5/10 |
| 2022/0324385 | A1* | 10/2022 | Li | B60R 1/088 |
| 2023/0162695 | A1 | 5/2023 | Chau et al. | |

FOREIGN PATENT DOCUMENTS

| | | |
|---|---|---|
| CN | 113763893 | 12/2021 |
| TW | 201528237 | 7/2015 |
| TW | 202111687 | 3/2021 |

* cited by examiner

PROCESSING SYSTEM FOR SIMULTANEOUSLY PRESENTING BRIGHTNESS PERFORMANCE OF DIFFERENT AREAS ON A SINGLE DISPLAY SCREEN

CROSS-REFERENCE TO RELATED APPLICATIONS

This non-provisional application claims priority under 35 U.S.C. § 119(a) on Patent Application No(s). 112123729 filed in Taiwan, R.O.C. on Jun. 26, 2023, the entire contents of which are hereby incorporated by reference.

BACKGROUND OF THE DISCLOSURE

Technical Field

The present disclosure relates to the technical field of display brightness adjustment in general, and more particularly relates to a processing system for simultaneously presenting brightness performance of different areas on a single display screen, which is provided for adjusting a display screen of a single display device according to different degrees of visual light intensity in various fields, environments, time and installation locations and conditions, so as to achieve better screen brightness performance and viewing in visual applications of naked views.

Description of the Related Art

For now, display devices are well-developed electronic products, and their most direct function is to display information on screen for viewing. However, inappropriate brightness of the screen will affect people's viewing. In general, the brightness of a display device is measured in nits, and the brightness of a common display device is usually between 200 nits and 350 nits, although the exact value may vary depending on the manufacturer and model of the display device. As for high-brightness display devices, they are usually designed with a brightness exceeding 350 nits, and some of these display devices are suitable for use in bright environments such as outdoors or places with strong backlight. In addition, high dynamic display range (HDR) display devices have higher brightness capabilities, even exceeding 1000 nits or more, and the high brightness level is conducive to the presentation of a wider range of brightness in order to provide a more realistic image.

On the other hand, some display devices are designed with local dimming technology to improve the contrast and black performance of the display device and provide better image quality, in addition to the basic brightness design. Specifically, the local backlight control adjusts the brightness of the backlight to different areas according to the image content. For example, when a part of the image needs to display deep black, its brightness in the corresponding backlight area can be reduced to enhance the black performance. Similarly, when bright white or high-brightness areas need to be displayed, its brightness in the corresponding backlight area can be increased to provide better brightness performance. In other words, the local backlight control depends on the backlight brightness adjustment to different areas in the content of image, thus enhancing the contrast of the image. This means that the black color presented in the image content will appear deeper and the white color brighter, increasing the difference between the darkest black color and the brightest white color and making the overall image content more vivid and close to the real-world perception, especially in dark scenes where the backlight can be reduced to show more screen details.

However, in order to adapt the brightness of a single display device to factors such as different fields or environments, even if there is an adjustment function, the display device screen has different light receiving levels, and currently there is no area division in the single display device for adjusting brightness for better display effect. As for the aforementioned local backlight control makes adjustment according to the content information of the image in order to increase screen contrast and detail performance. In other words, this adjustment can be interpreted as "active" change according to the content of the image information; however, "passive" change according to the degree of light sensitivity after exposure to light is not currently available. If the same brightness is used for presenting the display, the overall screen will be too bright or too dark which cannot be adapted to both the upper and lower half display areas. For example, in-vehicle display devices or head-up display device screens are gradually becoming larger in size for drivers to view more easily. However, due to the limited space in the car, there may be a visual problem that the perceived ambient light intensity is insufficient in the lower half of the display screen in the car, but the upper half area of the display screen is relatively brighter. If the display is presented with the same brightness, the overall screen will be too bright or too dark, making it impossible to adapt to the upper and lower display areas. On the other hand, diversified specifications and configurations are also required for display devices in different fields. For example, the display screen may change from the basic aspect ratio 1:1 or 3:2 to 16:9, It is not difficult to imagine the emergence of special applications with narrower and longer ranges in the future. In view of the new specifications such as the aspect ratio of the display screen and the simultaneous use by multiple people, the technical means of brightness display performance in the same display device screen in response to different needs and purposes is naturally derived, that is, through regional brightness performance to meet the current needs of different users and purposes. For example, a display device installed across the windshield in the car space and configured corresponding to the driver positon and the front passenger position is a suitable example. How to simultaneously meet the current application need of these users while providing regional brightness performance demands feasible solutions.

In view of this problem, the team of the present disclosure perceived and proposed a processing system for simultaneously presenting brightness performance of different areas on a single display screen to overcome the aforementioned drawback of poor visibility of the display device caused by a constant display brightness performance of the overall screen under different environmental conditions such as fields, time, etc. by the technical means of adapting display brightness according to the difference in light sensitivity of the display areas after receiving light.

SUMMARY OF THE DISCLOSURE

One of the objectives of the present disclosure is to provide a single display device, such that when the same display surface of the display device after installation presents obviously different light intensity and usage condition due to factors such as field, environment, time, etc., for example, when the upper and lower areas of a vehicle-mounted display device have different light sensitivities due to the installation or projection position or when the left and right areas of the vehicle-mounted display device have different viewing requirements, or when a continued display device with curved corners installed on the external wall of a building has different light sensitivity, etc., the present disclosure can be used as a technological means for the brightness performance of different zones on the display device, so that the overall picture of the display device can be clearly visible to the viewers.

To achieve the aforementioned objective, the present disclosure provides a processing system for simultaneously presenting brightness performance of different areas on a single display screen, including: a detection processor, for performing a multi-point photometry of a pre-imaging area of a display device after the display device is installed or projected for viewing to find out an ambient light intensity distribution presented in each spot on the display screen after the display device is installed; and a control processor, telecommunicatively coupled to the detection processor, for cutting a screen range of the display device into a plurality of modulation areas according to the difference of an ambient light intensity distribution presented in the pre-imaging area; wherein the control processor adjust the outputs of a first portion of the modulation areas, corresponding to a portion with a relatively stronger ambient light sensitivity in the pre-imaging area, to have a relatively higher brightness display performance.

Preferably, the control processor adjusts one or a combination of the outputted current value and the outputted Gamma value of the modulation areas to realize a plurality of modulation areas with different brightness display performance.

Preferably, the display device comprises at least one curved corner, so that the screen of the display device is not on the same plane with the display device.

Preferably, the detection processor further includes a manual trigger unit provided for an external user to turn on the detection processor through the manual trigger unit to perform a photometric operation at any time.

Preferably, the detection processor further includes a timer trigger unit provided for an external user to set at least one trigger time through the timer trigger unit, so as to achieve the effect of turning on the detection processor to perform a photometric operation at the trigger time.

Preferably, the detection processor further includes a light and dark trigger unit provided for an external user to set at least one environment triggered brightness through the light and dark trigger unit, so as to achieve the effect of turning on the detection processor to perform a photometric operation at the environment triggered brightness.

Preferably, the screen range of the display device is set to a plurality of light sensing elements, an ambient light intensity is presented by each of the light sensing elements and its other neighboring light sensing elements, and a multiple relationship is calculated by dividing the light sensing element that presents a relatively stronger ambient light intensity by the light sensing element that presents a relatively weaker ambient light intensity, wherein when the multiple relationship is greater than or equal to a predetermined multiple, a divided section is defined and formed between the two dimming elements corresponding to the two neighboring light sensing elements that satisfy the condition of the predetermined multiple, and then at least one cutting line continuously formed by the plurality of the divided sections cuts the screen range of the display device to form the modulation areas. Preferably, the predetermined multiple is greater than or equal to 1.2, so that the area with a specific light sensitivity difference is cut and divided.

Based on the same technical concept, the present disclosure also provides a processing system for simultaneously presenting brightness performance of different areas on a single display screen, including: a detection processor, for finding a direct view range of a driver position and a front passenger position for a pre-imaging area of a display device installed in a car; and a control processor, telecommunicatively coupled to the detection processor, the control processor for cutting a screen range of the display device along the X-axis into a first modulation area corresponding to a driver position direct view range and a second modulation area corresponding to a front passenger position direct view range according to the direct view range of the driver position and the direct view range of the front passenger position in the pre-imaging area; and the control processor adjusts one or a combination of the output of a current value and the output of a Gamma value for the first modulation area and the second modulation area, such that the first modulation area has a first brightness display performance, and the second modulation area has a second brightness display performance different from the first brightness display performance.

Preferably, the first brightness display performance has an adjustable brightness range greater than the adjustable brightness range of the second brightness display performance.

In summation of the description above, when the processing system for simultaneously presenting brightness performance in different areas of a single display device is applied in various display devices, due to factors such as the field, environment, time, installation location, etc., the different light receptions and usage conditions of the display screen of the single display device make it unfavorable for naked view. In the present disclosure, the light reception areas with different light reception levels can be adjusted to have regional brightness performance. In this way, the screen range of the display device with a relatively stronger ambient light sensitivity can be adjusted to have a display effect of a relatively higher brightness, or the screen range of the display device with a relatively lower ambient light sensitivity can be adjusted to have a display effect of a relatively lower brightness, and the same technical concept can be applied to a display screen installed at the front end of a car, and based on the driver position and the front passenger position and the different usage requirements, the regional brightness performance can be adjusted automatically, and the display screen at the driver position can further have a wider brightness performance change range. In this way, even in a special application such as a display device with bending characteristics will cause the screen to receive different light intensities after installation, and the display effect can be easily adjusted through the regional brightness performance. Furthermore, by using changes in current or Gamma value or both, the flexibility of adjusting the regional brightness performance can be greatly improved, such as cutting the display screen into a larger number of modulation intervals with different intensities. In addition, the single display device under different time or fields or environments inevitably has a change of light reception level, rather than remaining unchanged. For example, the difference between day and night, the difference between sunny and cloudy days, and the difference between a display device with mobile characteristics such as a vehicle-mounted display device indoors such as a tunnel or outdoors, etc., may cause changes in the level of light reception of the screen of the original display device. Therefore, it is necessary to perform the photometry again in order to obtain better display effect. With the manual trigger unit, timer trigger unit, or light and dark trigger unit, the present disclosure can dynamically adjust the display device more flexibly and accurately for better display effect. As to the unique cutting technology of the present disclosure, it is used to flexibly obtain the cutting lines that should be divided according to their configuration relationships, and the single display device is formed into two or more modulation areas, thereby utilizing this diversified cutting and adjustments enables the display device to present excellent visual performance.

DESCRIPTION OF THE PREFERRED EMBODIMENTS

The objectives, technical contents and features of this disclosure will become apparent in the following detailed description of the preferred embodiments with reference to the accompanying drawings. It is noteworthy that the drawings used in the specification and subject matters of this disclosure are intended for illustrating the technical characteristics of this disclosure, but not necessarily to be drawn according to actual proportion and precise configuration. Therefore, the scope of this disclosure should not be limited to the proportion and configuration of the drawings.

Figure 5:
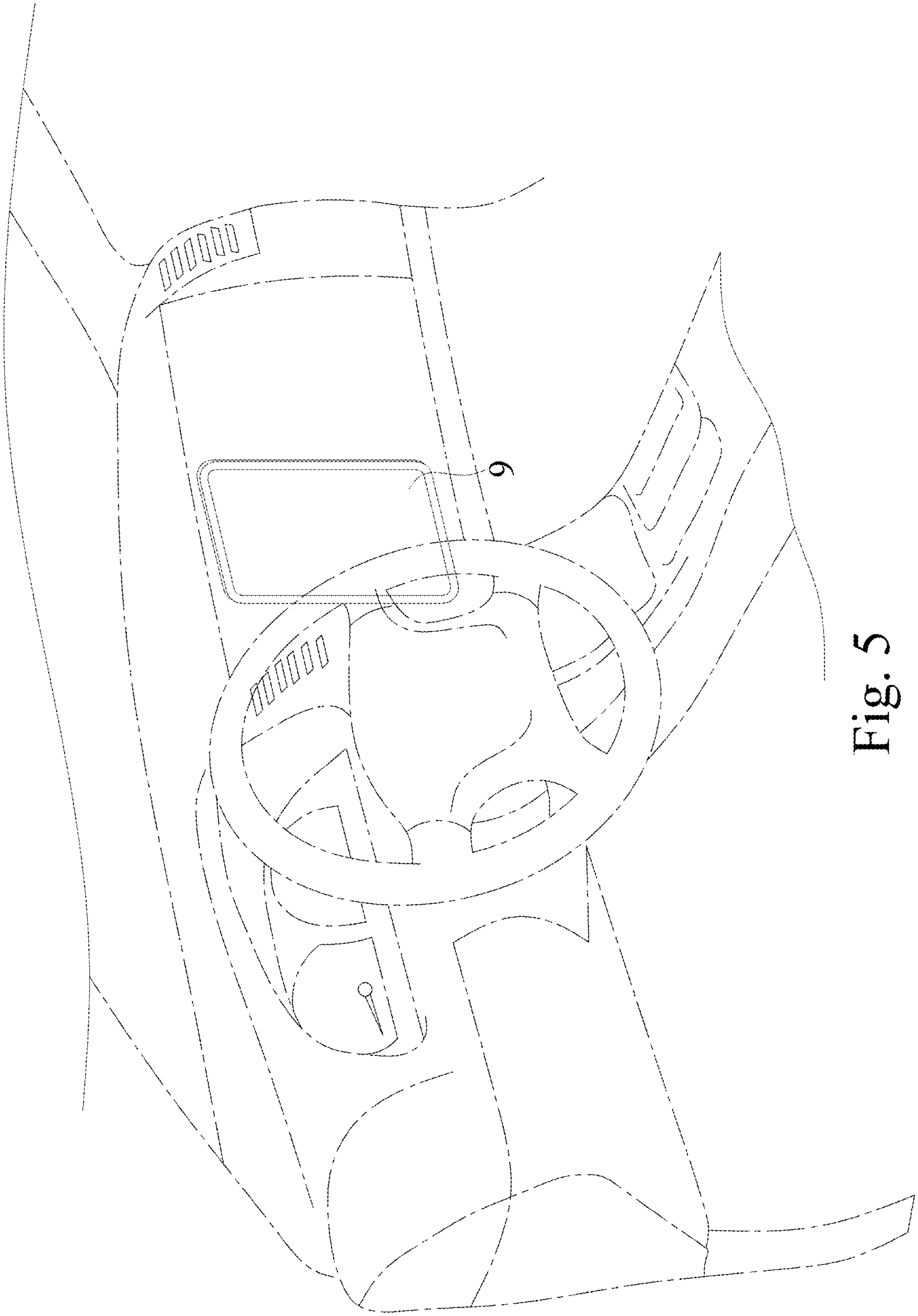
FIG. 5 is a schematic view of a pre-imaging area of a direct view vehicle-mounted display device in accordance with a preferred embodiment of the present disclosure.
Figure 6:
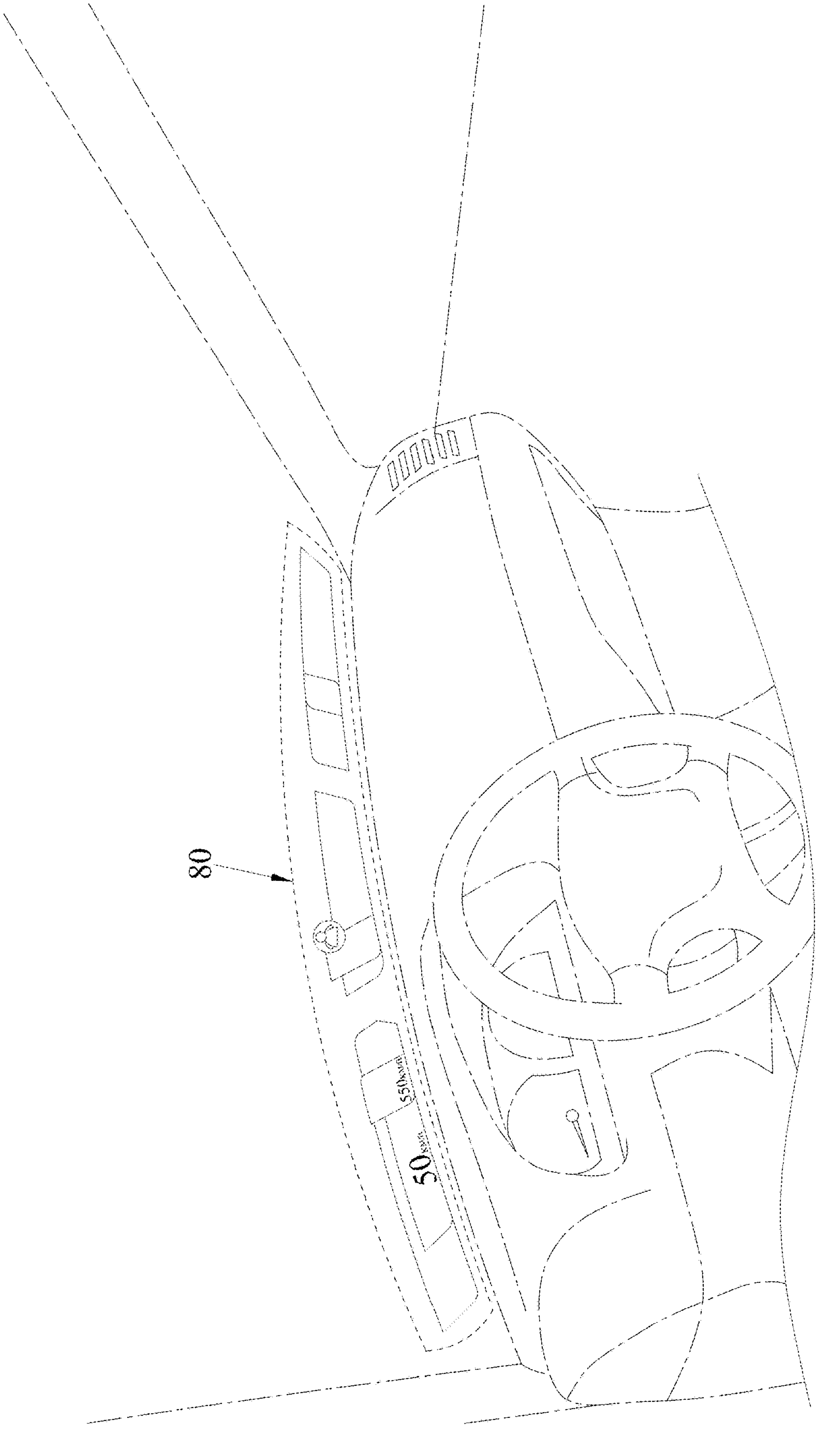
FIG. 6 is a schematic view of a pre-imaging area of a direct view vehicle-mounted head-up display device in accordance with a preferred embodiment of the present disclosure.

With reference to FIGS. 1~4, 5 and 6 for the functional block diagram of a preferred embodiment of the present disclosure, the functional block diagram of another implementation mode of the preferred embodiment of the present disclosure, the schematic view of a predetermined installation location of a display device being a pre-imaging area of the preferred embodiment of the present disclosure, the schematic view of cutting a screen range to form modulation areas in accordance with the preferred embodiment of the present disclosure and the schematic views of a pre-imaging area of a direct view vehicle-mounted display device and a head-up vehicle-mounted display device in accordance with the preferred embodiment of the present disclosure respectively, the present disclosure provides a processing system for simultaneously presenting brightness performance of different areas on a single display screen, which includes a detection processor 1 and a control processor 2. The detection processor 1 is provided for presenting a direct view screen for the predetermined installation location of a display device 9 (as shown in FIG. 5), or a projecting screen after installation (as shown in FIG. 6) to perform a multipoint photometry of a pre-imaging area 80 for viewing, and the detection processor 1 finds out the ambient light intensity distribution difference of different spots on the screen of the display device 9 after the display device 9 is installed for actual viewing. In this way, through the detection of the corresponding predicted position on the screen, that is, the ambient light intensity distribution difference in the pre-imaging area 80 is detected in advance to predict the extent to which the ambient light may affect certain areas when the user is viewing, and then the regional brightness is adjusted to allow users to improve the reading and retrieval of visual information for the overall display screen.

Figure 7:
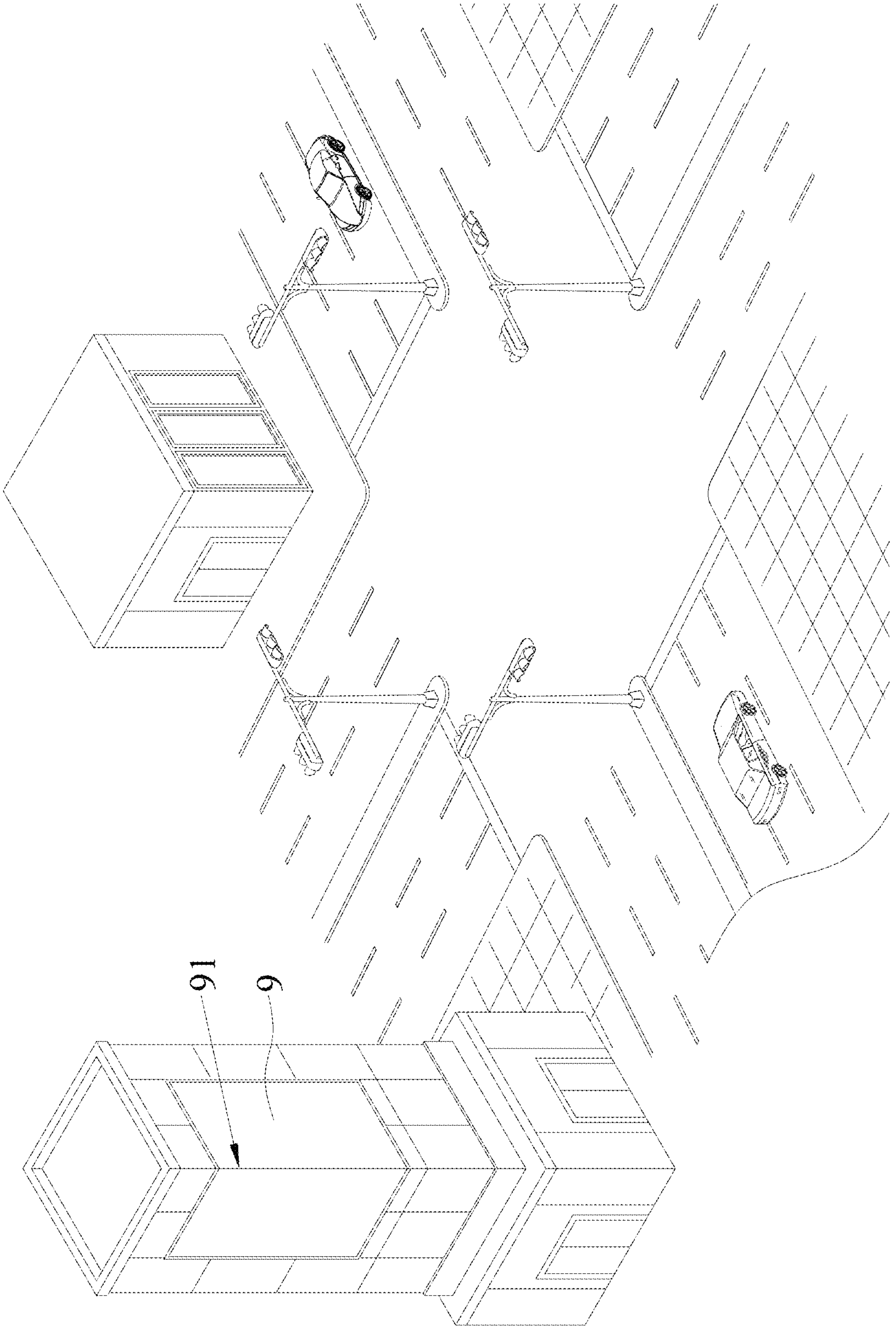
FIG. 7 is a schematic view of a pre-imaging area of a display device installed on an external wall of a building in accordance with a preferred embodiment of the present disclosure.

Further, after the detection processor 1 detects the ambient light intensity distribution difference in the pre-imaging area 80, the control processor 2 telecommunicatively connected to the detection processor 1 is used to cut the screen range of the display device 9 into a plurality of modulation areas 20 according to the ambient light intensity distribution difference presented in the pre-imaging area 80. When the screen range of the display device 9 is presented with a relatively stronger ambient light sensitivity in the pre-imaging area 80, the control processor adjusts the outputs of a first portion of the modulation areas 20, corresponding to a portion with a relatively stronger ambient light sensitivity in the pre-imaging area 80, to have a relatively higher brightness display performance; and the control processor adjusts the outputs of a second portion of the modulation areas 20, corresponding to a portion with a relatively weaker ambient light sensitivity in the pre-imaging area 80, to have a relatively lower brightness display performance. For example, in actual driving experience, vehicle mounted display devices are often installed in cars and provided to overcome the drivers' difficult viewing issue at night or in underground parking lots, but once driving under the bright sun, its brightness is obviously insufficient and it is difficult for the drivers to see clearly, which seriously affects road safety. Similarly, a more accurate actual situation is the same issue caused by the light reception difference in various environments. For example, due to the limited space in the car, there are many cases where a significant difference exists between the upper and lower ambient light perceptions of the display screen of the direct-view vehicle-mounted display device or head-up display device. At this time, if the overall brightness performance of the display device is increased ignorantly, the dark areas of the display screen will be too bright or the bright areas of the display screen will be too dark. Therefore, with the processing system for simultaneously presenting brightness performance of different areas on a single display screen in accordance with the present disclosure, the pre-imaging area 80 can be adjusted effectively to avoid the different levels of light reception caused by direct light intensity difference or shadowing which will affect the users' viewing. With reference to FIG. 7 for the schematic view of a pre-imaging area configured on an external wall of a building in accordance with the preferred embodiment of the present disclosure, a single display device with a bending characteristic is installed on an external wall of a building, since the display device 9 has at least one curved corner 91, such that the screen of the display device 9 is not on the same plane of the display device 9, leading to the result in a significant difference in the level of light reception due to the different orientation of the light reception. At this time, for different oriented viewers, a different regional brightness performance should be provided to improve the adaptability. It is noteworthy that the target for the adjustment of regional brightness performance of the present disclosure refers to the screen of a single display device. If a multiple of display devices are combined for the application, it is obviously not the intended target of the present disclosure. In the configuration of a multiple of display devices combined with each other, the output of the screen each display device can be adjusted separately without the need for the special technical means of the present disclosure.

Further, the pre-imaging area 80 may have an ambient light intensity distribution difference in a multiple of different areas or experience non-uniformity in light intensity in different areas. In order to facilitate the adjustment of the brightness performance in different areas, the control processor 2 adjusts one or both of the outputted current value or the outputted Gamma value of the modulation areas 20, to realize a plurality of modulation areas 20 with different brightness display performance. For example, the same current with different gamma curves, or the same gamma curve with different current values is used, or both are adjusted at the same time to control the brightness output.

Considering that the pre-imaging area 80 may actually have a diversified ambient light intensity distribution difference, the present disclosure uses a unique cutting technology to cut and form the modulation areas 20, where the detection processor 1 is used to set the pre-imaging area 80 which is cut into a plurality of light sensing elements 801, such as the concept of checkerboard cutting. Next, the control processor 2 cuts the screen range of the display device 9 into a plurality of dimming elements 201 corresponding to the light sensing elements 801 respectively. In other words, the light sensing elements 801 and the dimming elements 201 are completely in one-to-one correspondence, and the detection processor 1 determines the ambient light intensity presented by each of the light sensing elements 801 and its neighboring light sensing elements 801 and calculates a multiple relationship by dividing the light sensing element 801 that presents a relatively stronger ambient light intensity by the light sensing element 801 that presents a relatively weaker ambient light intensity; where when the multiple relationship is greater than or equal to a predetermined multiple, the modulation processor 2 is defined to form all divided sections 21 between the two dimming elements 201 corresponding to the two adjacent light sensing elements 801 that satisfy the condition of the predetermine multiple. For example, the intensity ratio of the light reception of the light sensing element 801 to the light receiving of other neighboring light sensing elements 801 is 10:1:8:9:7, and if the predetermined multiple is set to 2, and the multiple relationship is 10; 1.25; 1.111, 1.429, so that the divided section 21 is formed only between the two light sensing elements 801 and the two corresponding two dimming element 201 with the ratio of 10:1. The condition of the predetermined multiple is the cutting sensitivity of the brightness difference. In other words, a threshold value for critical conditions is given for cutting when the difference is relatively large or small. Next, at least one cutting line 210 formed by the continuation of a plurality of the divided sections 21 is used to cut the screen range of the display device 9 to form the modulation areas 20. Wherein, the predetermined multiple can be greater than or equal to 1.2, which allows higher sensitivity to be used for cutting, so as to realize a fine zone dimming screen.

In addition, the level of light reception of the display device 9 will inevitably change rather than remain unchanged due to factors of different time, field, or environment, etc., for example, the difference between daytime and nighttime of a day, or weather factors such as the difference between sunny day and cloudy day with different brightness due to weather factors, or the difference caused by environmental changes due to movement, for example, a vehicle-mounted display device with mobile characteristics has different extents of light receptions in indoor venues and outdoor spaces (e.g. tunnel, parking lot, etc.), thereby changing the original level of light reception of the screen of the display device 9, so that it is necessary to appropriately perform a photometry again for better display effect. Based on this, the detection processor 1 further includes a manual trigger unit 12 provided for an external user to turn on the detection processor 1 through the manual trigger unit 12 to perform a photometric operation at any time; or the detection processor 1 further includes a timer trigger unit 14 provided for an external user to set at least one trigger time through the timer trigger unit 14 to achieve the effect of turning on the detection processor to perform a photometric operation at the trigger time; or the detection processor 1 further includes a light and dark trigger unit 16 provided for an external user to set at least one environment triggered brightness through the light and dark trigger unit 16 to achieve the effect of turning on the detection processor to perform a photometric operation at the environment triggered brightness. In this way, the manual trigger unit 12, the timer trigger unit 14, or the light and dark trigger unit 16 of the present disclosure can be used to dynamically adjust the regional brightness performance of the display device 9 for a better display effect.

Figure 1:
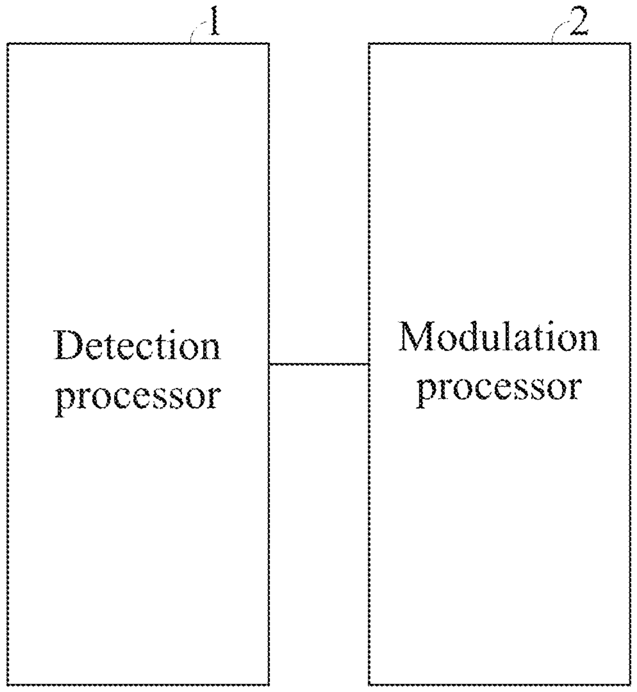
FIG. 1 is a schematic functional block diagram of a preferred embodiment of the present disclosure.
Figure 2:
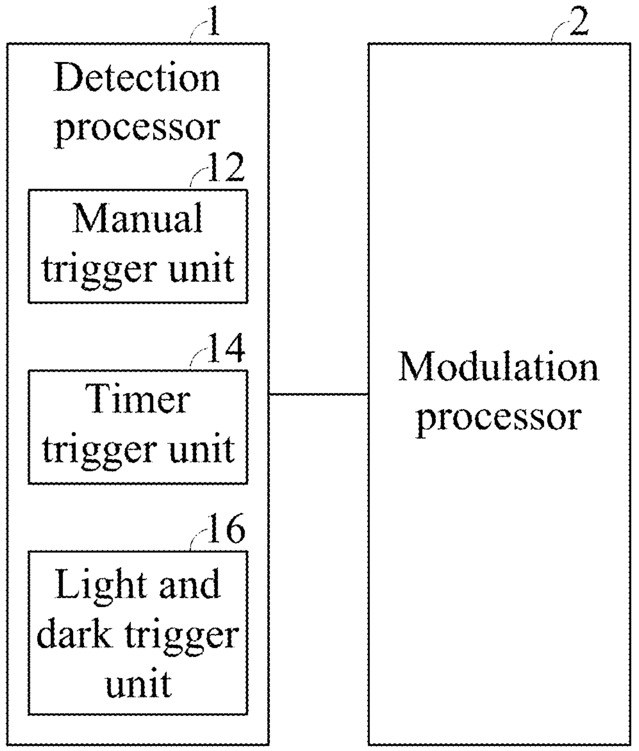
FIG. 2 is a schematic functional block diagram of another implementation mode of the preferred embodiment of the present disclosure.
Figure 3:
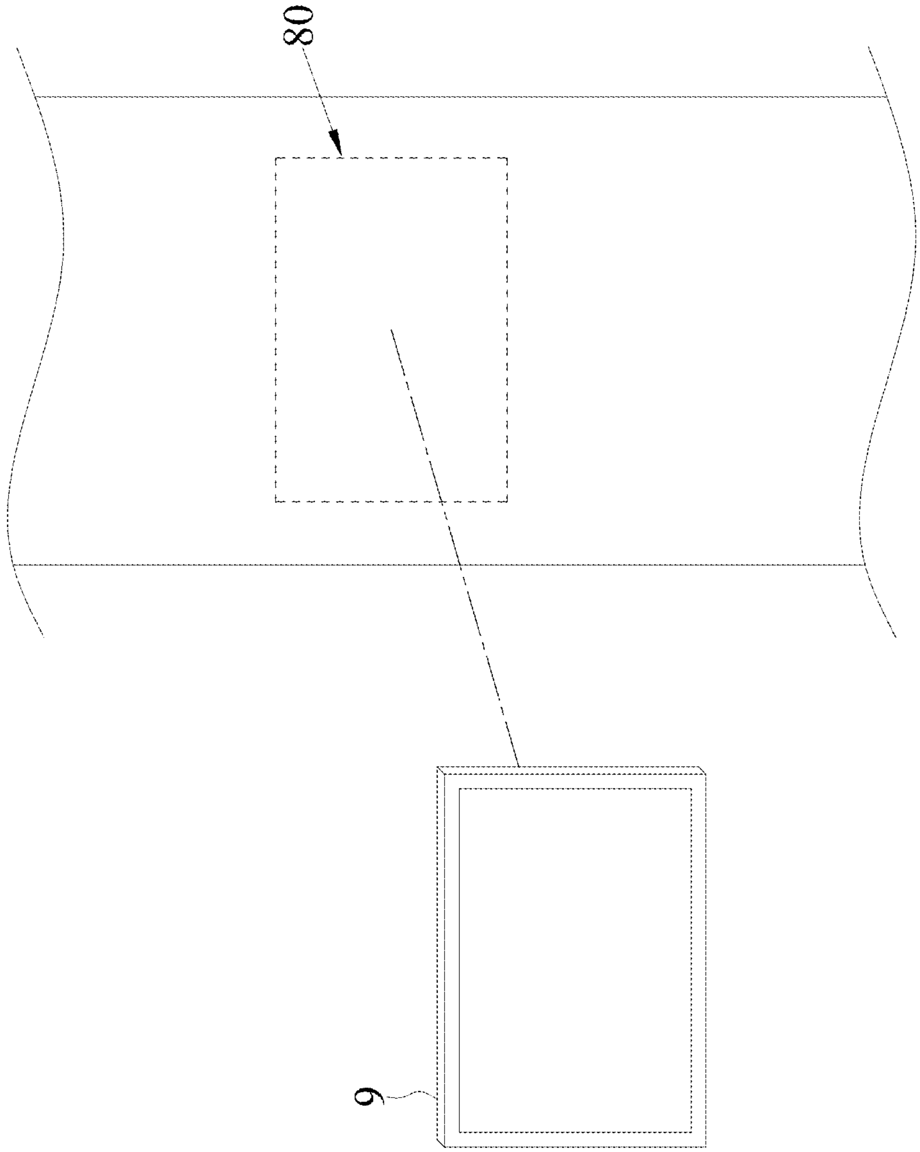
FIG. 3 is a schematic view of a predetermined installation location of a display device being a pre-imaging area of a preferred embodiment of the present disclosure.
Figure 4:
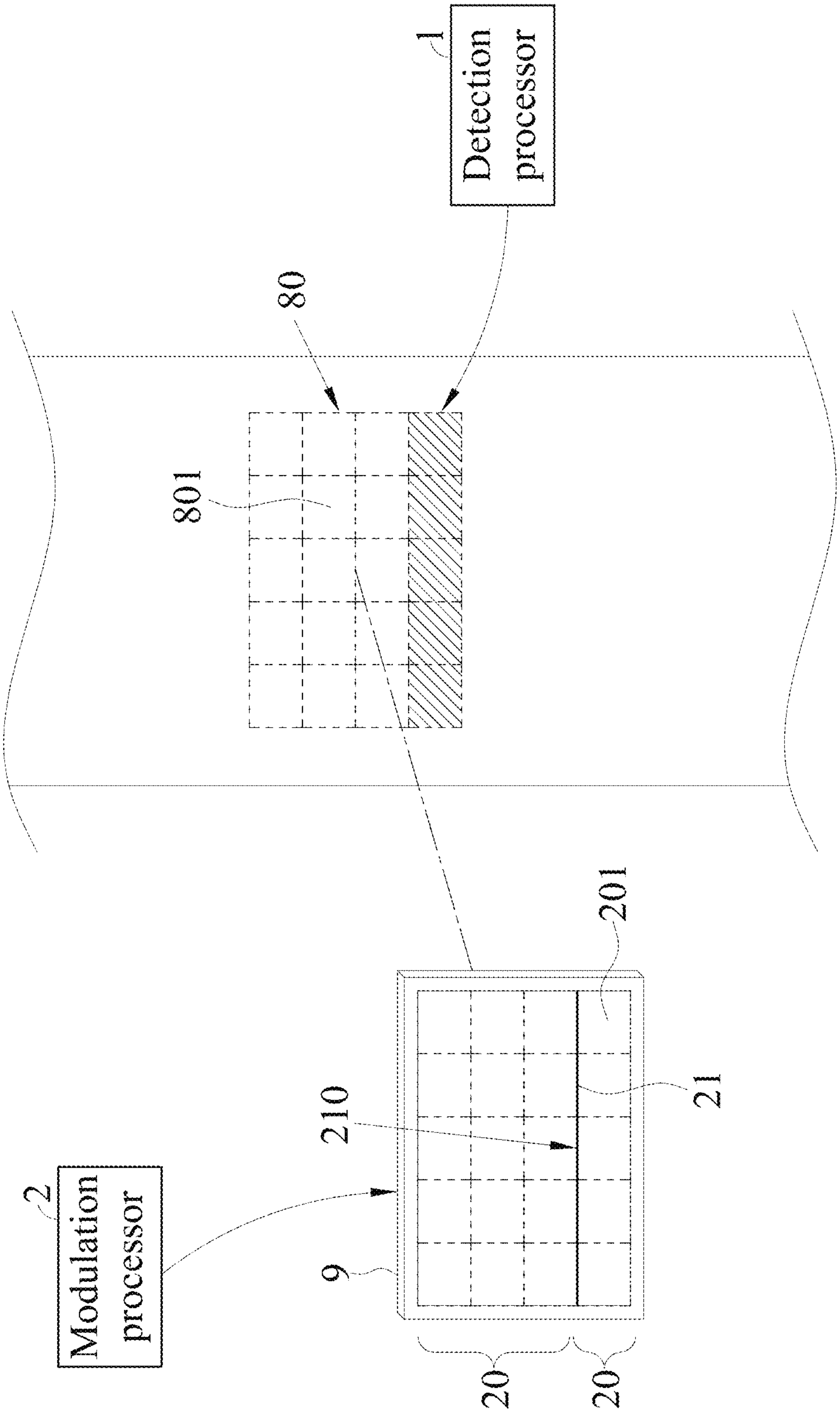
FIG. 4 is a schematic view of cutting a screen range to form modulation areas in accordance with a preferred embodiment of the present disclosure.
Figure 8:
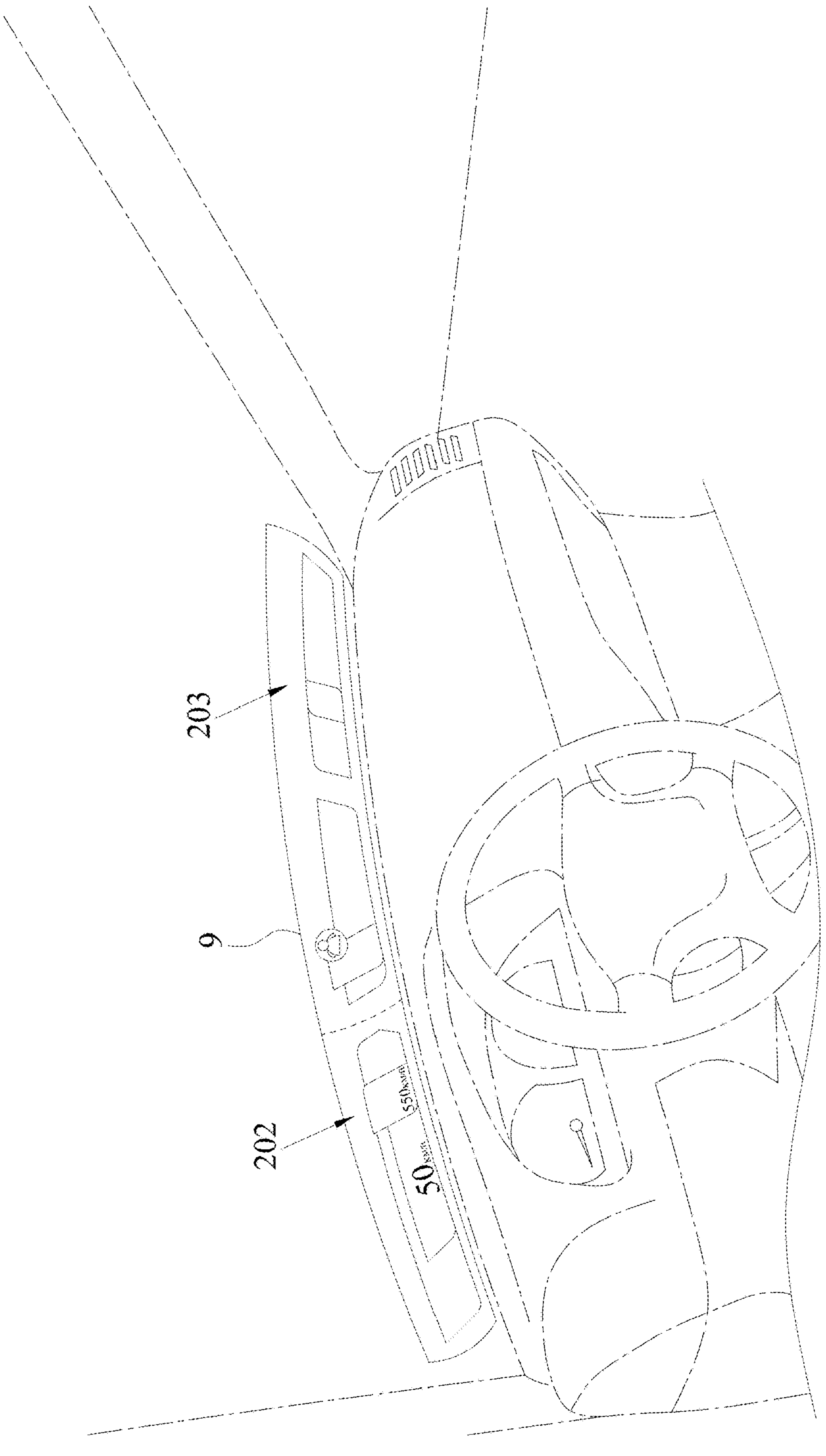
FIG. 8 is a schematic view of a first modulation area and a second modulation area of a vehicle-mounted display device, which are cut, divided and formed corresponding to the driver position and the front passenger position respectively in accordance with a further implementation mode of a preferred embodiment of the present disclosure.

In FIGS. 1 and 8, FIG. 8 is the schematic view showing a first modulation area and a second modulation area of a vehicle-mounted display device, which are cut, divided and formed corresponding to the driver position and the front passenger position respectively in accordance with a further implementation mode of a preferred embodiment of the present disclosure, based on the technical concept of the regional brightness performance in the screen of the single display device screen, this implementation mode of the present disclosure further discloses a processing system for simultaneously presenting brightness performance of different areas on a single display screen, and this processing system also includes the detection processor 1 and the control processor 2. In this implementation mode, the detection processor 1 is provided for finding out a direct view range of a pre-imaging area 80 of the driver position and the front passenger position for a display device 9 installed in cars. The control processor 2 is telecommunicatively connected to the detection processor 1 and the control processor 2 according to the direct view range of the driver position and the direct view range of the front passenger position of the pre-imaging area 80, cut the screen range of the display device 9 along the X-axis to form a first modulation area 202 corresponding to the direct view range of the driver position and a second modulation area 203 corresponding to the direct view range of the front passenger position; wherein the control processor 2 adjusts one or both of the outputted current value and the outputted Gamma value for the first modulation area 202 and the second modulation area 203, such that the first modulation area 202 has a first brightness display performance, and the second modulation area 203 has a second brightness display performance different from the first brightness display performance. Therefore, the first modulation area 202 and the second modulation area 203 of the display device 9 have a first brightness display performance and a second brightness display performance different from each other to meet the different view requirements of the driver and the front passenger. The above-mentioned finding of the direct view range refers to parameters and conditions of the reasonable dimensions of a car model and the interior space in a car, such as the left or right distance, the distance between the seat and the windshield and the normal height of an adult, etc. By computer simulation, a rough view range of a direct view of a driver or a front passenger is obtained. Of course, this does not mean that further adjustments cannot be made according to the actual application situation, for example, after the first modulation area 202 and the second modulation area 203 have been formed by cutting, it is still possible to simulate and change the first modulation area 202 and the second modulation area 203 again by inputting various parameters, such as the actual height of driver and front passenger; the driver and front passenger's habitual seat position, and so on, so as to adjust to the appropriate cutting status based on the actual driver and riding habit. As for the brightness performance difference in a specific situation, the first modulation area 202 for the driver position is provided for the driver's operation of the vehicle, so that there are also safety considerations in addition to providing a clear viewing of the display screen for the driver. The second modulation area 203 for the front passenger position is mainly provided for the viewing by the front passenger and there is no concern on driving safety, so that areas can be divided into different brightness performance for the display accordingly.

Further, the first brightness display performance has an adjustable brightness range greater than the adjustable brightness range of the second brightness display performance, so that the first modulation area 202 corresponding to the driver position has a relatively greater brightness change range, and the first brightness display performance can be adjusted to an appropriate state in different situations at any time through the greater adjustable range to allow driver to view the display screen clearly in various situations, while ensuring the driver's driving safety. As described above, since the viewing and operation of the front passenger during the driving process are less prone to dangerous situations, so that the adjustable brightness range of the second brightness display performance is smaller than the adjustable brightness range of the first brightness display performance.

In summation of the description above, the processing system for simultaneously presenting brightness performance of different areas in the single display device in accordance with the present disclosure can effectively overcome the issues occurred in different applications that various factors such as fields, environments, time and installation locations and conditions may affect the light reception of the display screen of the single display device in different backgrounds or different usage requirements, which are unfavorable to the naked view. Through the present disclosure, the display device can be appropriately adjusted for different light reception areas with different light reception levels, usage requirements or conditions to achieve regional brightness performance. In this way, the screen range of the display device with a relatively stronger ambient light sensitivity can be adjusted to have a display effect for the relatively higher brightness; and the screen range of the display device with a relatively weaker ambient light sensitivity can be adjusted to have a display effect for the relatively lower brightness. Based on this, even if facing a special application such as a display with bending characteristic that causes the screen to receive different light reception after installation, the display effect can be easily adjusted through regional brightness performance; or in a vehicle-mount display application, the display screen of a single display device can be divided according to the driving position and the passenger position to present different brightness to take both of the clear viewing and the driving safety into account. Furthermore, changes in current or Gamma value or both are used, and the flexibility of the adjustment of the regional brightness performance can be greatly improved, such as cutting to form a larger number of modulation intervals with different intensities. In addition, the level of light reception inevitably changes rather than remaining unchanged due to the factors of different time, field, or environment of the single display device. For example, the difference between daytime and nighttime of a day, and the difference between a display device with mobile characteristics such as a vehicle-mounted display device indoors such as a tunnel or outdoors, etc. may cause changes in the level of light reception of the screen of the original display device, therefore it is necessary to perform the photometry again in order to obtain better display effect. With the manual trigger unit, timer trigger unit, or light and dark trigger unit, the present disclosure can dynamically adjust the display device more flexibly and accurately for better display effect. As to the unique cutting technology of the present disclosure, it is used to flexibly obtain the cutting lines that should be divided according to their configuration relationships, and the single display device is formed into two or more modulation areas, thereby utilizing this diversified cutting and adjustments enables the display device to present excellent visual performance.

What is claimed is:

1. A processing system for simultaneously presenting brightness performance of different areas on a single display screen, comprising:

a detection processor, for performing a multi-point photometry in a pre-imaging area of a display device after the display device is installed or projected for viewing to find out an ambient light intensity distribution presented in each spot on the single display screen after the display device is installed; and a control processor, telecommunicatively coupled to the detection processor, for cutting a screen range of the display device into a plurality of modulation areas according to a difference of an ambient light intensity distribution presented in the pre-imaging area, wherein the control processor adjusts outputs of a first portion of the plurality of modulation areas, corresponding to a portion with a relatively stronger ambient light sensitivity in the pre-imaging area, to have a relatively higher brightness display performance, the control processor adjusts outputs of a second portion of the plurality of modulation areas, corresponding to a portion with a relatively weaker ambient light sensitivity in the pre-imaging area, to have a relatively lower brightness display performance, and the control processor adjusts one or a combination of an outputted current value and an outputted Gamma value of the plurality of modulation areas to realize that the plurality of modulation areas has different brightness display performance, wherein the detection processor is used for setting and cutting the pre-imaging area into a plurality of light sensing elements, and the control processor cuts the screen range of the display device into a plurality of dimming elements corresponding to the plurality of light sensing elements, the control processor determines an ambient light intensity of each light sensing element and other light sensing elements adjacent to the light sensing element, and calculates a multiple relationship by dividing a light sensing element that presents a relatively stronger ambient light intensity by a light sensing element that presents a relatively weaker ambient light intensity, and when the multiple relationship is greater than or equal to a predetermined multiple, a divided section is defined and formed between two dimming elements corresponding to two neighboring light sensing elements that satisfy a condition of the predetermined multiple, and then at least one cutting line continuously formed by a plurality of divided sections, including the divided section, cuts the screen range of the display device to form the plurality of modulation areas.

2. The processing system according to claim 1, wherein the display device comprises at least one curved corner, so that the single display screen of the display device is not on the same plane with the display device.

3. The processing system according to claim 1, wherein the detection processor comprises a manual trigger unit provided for an external user to turn on the detection processor through the manual trigger unit to perform a photometric operation at any time.

4. The processing system according to claim 1, wherein the detection processor comprises a timer trigger unit provided for an external user to set at least one trigger time through the timer trigger unit, so as to achieve an effect of turning on the detection processor to perform a photometric operation at the at least one trigger time.

5. The processing system according to claim 1, wherein the detection processor comprises a light and dark trigger unit provided for an external user to set at least one environment triggered brightness through the light and dark trigger unit, so as to achieve an effect of turning on the detection processor to perform a photometric operation at the at least one environment triggered brightness.

6. The processing system according to claim 1, wherein the predetermined multiple is greater than or equal to 1.2.

* * * * *